(12) United States Patent
Huang et al.

(10) Patent No.: US 8,727,833 B2
(45) Date of Patent: May 20, 2014

(54) CERIUM-BASED PARTICLE COMPOSITION AND THE PREPARATION THEREOF

(75) Inventors: Aimin Huang, Shanghai (CN); Zhuohua Zhou, Shanghai (CN)

(73) Assignee: Rhodia (China) Co., Ltd., Shanghai (CN)

( * ) Notice: Subject to any disclaimer, the term of this patent is extended or adjusted under 35 U.S.C. 154(b) by 323 days.

(21) Appl. No.: 13/264,237

(22) PCT Filed: Apr. 15, 2009

(86) PCT No.: PCT/CN2009/000401
§ 371 (c)(1),
(2), (4) Date: Oct. 13, 2011

(87) PCT Pub. No.: WO2010/118553
PCT Pub. Date: Oct. 21, 2010

(65) Prior Publication Data
US 2012/0045972 A1   Feb. 23, 2012

(51) Int. Cl.
    B24B 1/00       (2006.01)
(52) U.S. Cl.
    USPC .......................... 451/41; 423/263; 423/21.1
(58) Field of Classification Search
    USPC .............. 451/41; 423/263, 21.1; 51/307, 309; 103/3
    See application file for complete search history.

(56) References Cited

U.S. PATENT DOCUMENTS

| | | | |
|---|---|---|---|
| 3,097,083 A * | 7/1963 | Silvernail | 51/307 |
| 4,106,915 A * | 8/1978 | Kagawa et al. | 51/296 |
| 4,529,410 A | 7/1985 | Khaladji et al. | |
| 4,601,755 A * | 7/1986 | Melard et al. | 106/3 |
| 5,804,513 A | 9/1998 | Sakatani et al. | |
| 6,454,821 B1 * | 9/2002 | Abbasi et al. | 51/309 |
| 6,607,570 B1 * | 8/2003 | Rosenflanz et al. | 51/309 |
| 6,656,872 B2 * | 12/2003 | Labhasetwar et al. | 502/303 |
| 6,666,750 B1 * | 12/2003 | Rosenflanz | 451/28 |
| 6,942,554 B1 * | 9/2005 | Mandina | 451/165 |
| 7,010,939 B2 * | 3/2006 | Yoshikawa et al. | 65/30.14 |
| 7,156,888 B2 * | 1/2007 | Mochizuki | 51/307 |
| 7,300,478 B2 * | 11/2007 | Ferranti et al. | 51/298 |
| 7,470,297 B2 * | 12/2008 | Bessho et al. | 51/307 |
| 8,480,454 B2 * | 7/2013 | Saito et al. | 451/41 |
| 2002/0086618 A1 * | 7/2002 | Ota et al. | 451/41 |
| 2004/0111977 A1 | 6/2004 | Mochizuki | |
| 2004/0182954 A1 * | 9/2004 | Ito et al. | 241/23 |
| 2004/0223898 A1 * | 11/2004 | Ota et al. | 423/263 |
| 2005/0081998 A1 * | 4/2005 | Hampden-Smith et al. | 156/345.12 |

(Continued)

FOREIGN PATENT DOCUMENTS

| | | |
|---|---|---|
| CN | 1156749 | 8/1997 |
| CN | 1403376 | 3/2003 |

(Continued)

*Primary Examiner* — George Nguyen
(74) *Attorney, Agent, or Firm* — Cesari and McKenna, LLP

(57) ABSTRACT

A cerium based particle composition comprises: 50-90% by weight of cerium oxide, and at least 10% by weight of lanthanum oxide. The method to prepare the particle composition comprises: one or more water soluble salts of transition metal elements and/or alkaline metal elements are mixed with $CeLaCl_3$ solution; the mixed solution is precipitated with carbonate(s) and/or hydroxide(s) to obtain rare earth carbonate(s) doped by said one or more transition metal elements and/or alkaline metal elements; the carbonate(s) is calcined and crushed to obtain the said particle composition. The said composition can be mixed with water, optionally at the presence of additive(s), in order to obtain an abrasive for polishing glass for liquid crystal display and hard recording medium, particularly in the use of polishing glass substrate industry.

20 Claims, 7 Drawing Sheets

(56) References Cited

U.S. PATENT DOCUMENTS

| | | | |
|---|---|---|---|
| 2007/0104629 A1* | 5/2007 | Yadav | 423/21.1 |
| 2010/0022171 A1* | 1/2010 | Naguib et al. | 451/41 |
| 2010/0127610 A1* | 5/2010 | Guenther et al. | 313/284 |
| 2010/0258528 A1* | 10/2010 | Singh et al. | 216/53 |
| 2011/0165824 A1* | 7/2011 | Saito et al. | 451/41 |

FOREIGN PATENT DOCUMENTS

| | | |
|---|---|---|
| CN | 1403377 | 3/2003 |
| CN | 1701110 | 11/2005 |
| CN | 101481130 | 7/2009 |
| EP | 1219568 | 7/2002 |
| EP | 1707534 | 10/2006 |
| JP | 2002-356312 | 12/2002 |
| JP | 2003-277729 | 10/2003 |
| JP | 2007-009214 | 1/2007 |
| JP | 2009-007543 | 1/2009 |
| JP | 2009-501812 | 1/2009 |
| KR | 10-1998-0019046 | 6/1998 |
| KR | 10-2005-0019733 | 3/2005 |
| WO | WO 2005/000992 | 1/2005 |
| WO | 2007/052555 | 5/2007 |
| WO | WO 2007/105714 | 9/2007 |

* cited by examiner

CERIUM-BASED PARTICLE COMPOSITION AND THE PREPARATION THEREOF

CROSS REFERENCE TO RELATED APPLICATIONS

This application is the national stage application of international application number PCT/CN2009/000401, filed on Apr. 15, 2009, the contents of which are hereby incorporated by reference.

TECHNICAL FIELD

This invention relates to a cerium-based particle composition. In particular, this invention relates to an abrasive for polishing glass for liquid crystal display and hard recording medium.

BACKGROUND

Cerium based abrasives are used not only in traditional polishing of optical glass but also for polishing glass for liquid crystal display and hard recording medium. It is required that this type of abrasives has high polishing rate and produces a polished surface with excellent quality.

Generally, cerium based polishing powders are manufactured by following methods: rare earth (comprising cerium and optionally lanthanum, and optionally further rare earths) carbonates are slurried, wet pulverized, and treated with mineral acid such as HF. The obtained slurry is filtered, dried, and roasted, followed by subsequent pulverization and classification to obtain desired particle size. This process has the disadvantage of unable to adjust the composition of the abrasive materials, and therefore the polishing rate and the quality of polished surface cannot be improved greatly.

WO2007/052555A1 discloses a cerium polishing agent wherein the cerium oxide content relative to the total rare earth oxide (TREO) is no less than 90% by mass. This cerium polishing agent is characterized in that at least one specific element selected from the group consisting of Ti and group 5-12 elements having an atomic number of 80 or less is contained in an amount of 0.001-2.0% by mass relative to the total mass of the polishing rate.

EP1707534A1 describes an oxide solid solution powder composed mainly of an oxide of cerium that can be used as an abrasive. When glass materials such as glass substrates are polished by using the oxide solid solution powder in which an oxide of calcium is dissolved as a solid solution in rare earth oxides composed mainly of cerium oxide, the oxide solid solution powder can provide polished surfaces having a high polished surface precision, and is suitable for abrasives.

JP2007-9214A discloses a cerium-based abrasive which is free of F, and works at a high abrasion speed and with a good abrasion precision. The resulted abrasive has an F content of 0.5 wt % or less, and an alkali metal or alkaline earth metal content or an alkali metal and alkaline earth metal total content of 0.3-5 wt % in terms of elements.

In order to meet the required high polishing rate and excellent surface quality, some transition metal elements and alkaline earth metal elements such as Ti, Zr, and Ca were used in abrasives. However, it was required to have cerium content higher than 90% to obtain high polishing rate. In some cases, two or more of the elements were required in order to obtain a solid solution and to have both high polishing rate and high polished surface quality at the same time.

INVENTION DETAILS

In order to satisfy the requirement of higher polishing rate and excellent polished surface, the present invention provides an abrasive suitable for polishing glass for liquid crystal display and hard recording medium.

The present invention develops a series of cerium based polishing abrasives comprising Fe, Zr, Mn, etc. The abrasive is produced under controlled precipitation conditions such as reaction time, pH, temperature, etc., followed by calcinations, wet grinding, sieving, and so on conventional finishing steps. The obtained final abrasive has both high polishing rate and excellent polished surface quality.

Surprisingly, it is discovered that the abrasive quality of the said abrasives is highly improved with the addition of certain quantity of lanthanum oxide in the cerium-based abrasive composition, even when the content of cerium oxide in the composition is low. Without being bounded to any existing theories, it is understood that the combination of said cerium oxide and lanthanum oxide will help enhance the polishing rate and the polished surface quality.

In the first aspect, the present invention provides a cerium-based particle composition comprising: 50~90% by weight of cerium oxide, and at least 10% by weight of lanthanum oxide. Preferably, the composition comprises at least 15% by weight of lanthanum oxide. Generally, but not for the purpose to limit the invention, the composition of the present invention comprises no more than 30% by weight of lanthanum oxide.

In one of the preferred embodiments of the present invention, the composition further comprises additive(s) based on one or more transition metal elements and/or alkaline earth metal elements. The additive(s) is used to change the morphology and the crystal structure of the products. Specifically, the additive(s) functions to make particles more uniform in size and close to regularly ball-shaped, which is good for polishing.

Preferably, the composition comprises 60~85% by weight of cerium oxide. The weight of additive(s) is 0.2~5% of the total weight of the composition.

The said additive(s) is selected from the group of: Fe-based additive(s), Zr-based additive(s), Mn-based additive(s), and Al-based additive(s).

The additive(s) in the composition is in the form of oxide(s) which is dispersed or dissolved as a solid solution in the said particles. Generally, the particle size of the particle composition is 0.5~1.5 μm.

Unless otherwise defined herein or below in the remainder of the specification, terms of "cerium-based", "Fe-based", or "Al-based", mean that element of cerium, Fe or Al, respectively, contributes the most to the properties of the bulk. Generally, the content of cerium, Fe, or Al, respectively, is the major component, that is, its concentration is probably higher than 50%. Terms of "cerium oxide" or "lanthanum oxide", include different oxide(s) of element cerium or lanthanum with different valence states of cerium or lanthanum respectively, even with small amounts of other elements. However, preferably, they are directed to pure compound of cerium oxide or lanthanum oxide.

In the second aspect, the present invention provides a method to prepare the cerium-based abrasive composition. It comprises: desirable amount of water soluble Fe, Zr, or Mn salts, such as choride or nitrate, is mixed with $CeLaCl_3$ solution, which is precipitated with a carbonate salt and/or hydroxide such as sodium carbonate to obtain Fe, Zr, or Mn doped rare earth carbonate; this carbonate is then calcined using a proper heating profile to obtain Fe, Zr, or Mn doped rare earth oxide; after being crushed, milled, and sieved, the product has a medium particle size of 0.5 to 1.5 μm and a high polishing rate on alumino borosilicate glass.

In the third aspect, the present invention provides an abrasive comprising the said particle composition, and the application thereof. The abrasive composition of the present invention can be mixed with water, optionally at the presence of additive(s), in order to obtain an abrasive for polishing glass for liquid crystal display and hard recording medium, particularly in the use of polishing glass substrate in industry.

BRIEF DESCRIPTION OF THE DRAWINGS

The foregoing and other objects of the invention will be more clearly understood from the following description when read in conjunction with the accompanying drawings.

EMBODIMENT OF THE PRESENT INVENTION

The following examples are offered to illustrate, but not to limit the claimed invention.

Example 1 (Comparative)

Figure 1:
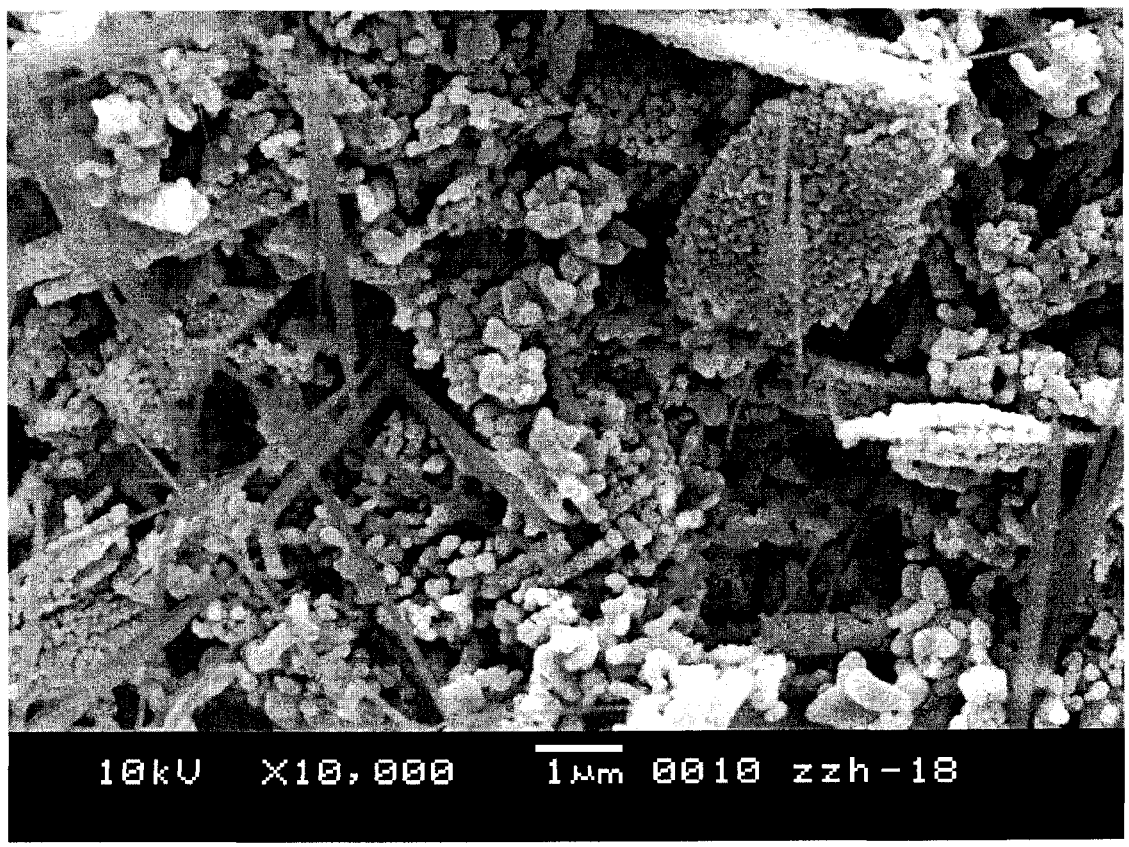
FIG. 1 is the SEM photo of the resulted product particles from the composition in one of the comparative embodiments of the present invention.

Product with the same cerium and lanthanum content but without addition of iron was prepared. The cerium chloride aqueous solution of 520 ml, and the lanthanum chloride aqueous solution of 280 ml were mixed to obtain a mixture liquid of about 800 ml. The ration in terms of oxide mass of respective rare earth elements in the mixed liquid was 65:35 ($=CeO_2$: $La_2O_3$). A 1.2-times-equivalent sodium carbonate aqueous solution of 800 ml (0.148 g/ml) was prepared. Then, 300 ml pure water was added in the reactor. While being stirred, the previously obtained mixture and sodium carbonate aqueous solution were fed to the reactor separately at 13.33 mL/min while agitation speed was kept at 150 rpm to obtain coprecipitate particles containing carbonates. Next, the suspension containing the coprecipitated particles was aged for 1.5 hours at room temperature. The suspension after aging was filtrated to obtain a cake of the coprecipitated particles which was rinsed with 2 L pure water for 2 times. Next, the obtained cake was calcined in a calcinations furnace, heated from 50° C. to 750° C. in 5 hours and kept at 750° C. for 1.5 hours). After that, rare earth is based oxide was obtained. An average particle size of the obtained abrasive was 4.0 µm. After crushing and milling, the average particle size was decreased to 0.9-1.0 µm. As shown in FIG. 1, the primary particles of the resulting product are not uniform in size and shape, which leads to scratch on the surface of glass polished.

The resulted product was tested on Labmaster-15 polishing machine (manufacture is Baikowski, Model is Labmaster-15) with working pressure of 150 g/cm$^2$ and rotation speed of 90 rmp for polishing rate evaluation. The glass used was alumino borosilicate commonly used in LCD. The resulting product has a removal rate of 0.75 µm/min.

Example 2

Particles Comprising Fe-based Additive

Figure 2:
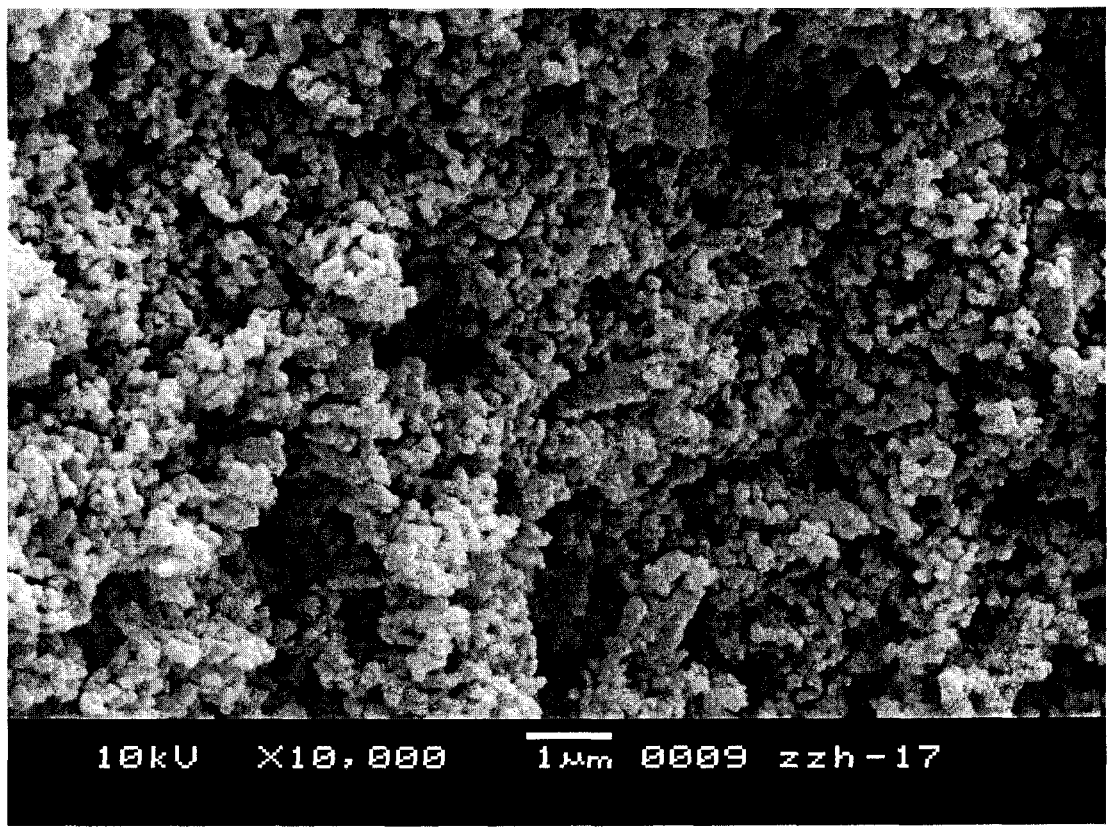
FIGS. 2 to 7 are SEM photos of particles of resulted products from various compositions in preferred embodiments of the present invention.

The cerium chloride aqueous solution of 520 ml, the lanthanum chloride aqueous solution of 280 ml were mixed, and further added with the Iron chloride hexahydrate 3.38 g to obtain a mixture liquid of about 800 ml. The ration in terms of oxide mass of respective rare earth elements and iron contained in the mixed liquid was 65:35:1($=CeO_2$: $La_2O_3$: $Fe_2O_3$). A 1.2-times-equivalent sodium carbonate aqueous solution of 800 ml (0.148 g/ml) was prepared. Then, 300 ml pure water was added in the reactor. While being stirred, the previously obtained mixture and sodium carbonate aqueous solution were fed to the reactor separately at 13.33 mL/min while agitation speed was kept at 150 rpm to obtain coprecipitate particles containing carbonates. Next, the suspension containing the coprecipitated particles was aged for 1.5 hours at room temperature. The suspension after aging was filtrated to obtain a cake of the coprecipitated particles which was rinsed with 2 L pure water for 2 times. Next, the obtained cake was calcined in a calcinations furnace, heated from 50° C. to 750° C. in 5 hours and kept at 750° C. for 1.5 hours). After that, iron containing rare earth based oxide was obtained. An average particle size of the obtained abrasive was 2.0 µm. As shown in FIG. 2, the primary particles of the resulting product are more uniform in size and shape, and smaller than those with no additives included, which can lead to better surface quality of glass polished when compared to comparative example (example 1). Same thing happened with examples 3 to 7. After crushing and milling, the average particle size was decreased to 0.9-1.0 µm.

The resulted product was tested on Labmaster-15 polishing machine (manufacture is Baikowski, Model is Labmaster-15) with working pressure of 150 g/cm$^2$ and rotation speed of 90 rmp for polishing rate evaluation. The glass used was alumino borosilicate commonly used in LCD. The product has a removal rate of 1.09 µm/mm.

Example 3

Particles Comprising Zr-based Additive

Figure 3:
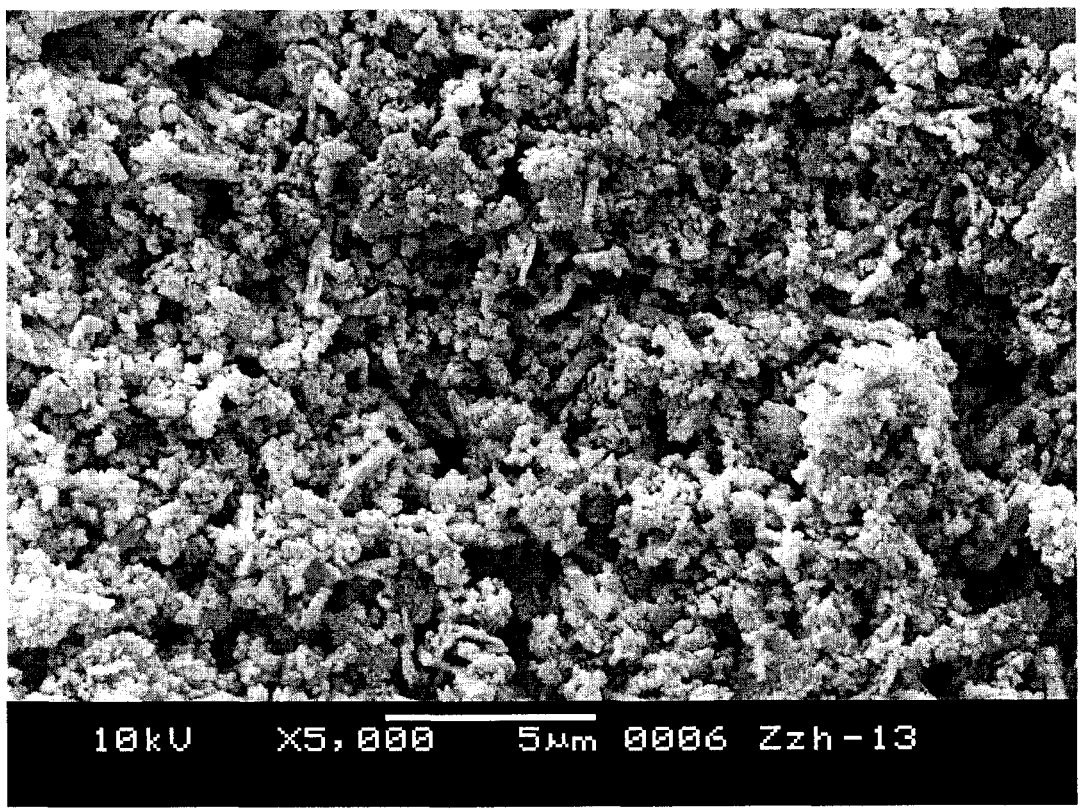

Product with same cerium and lanthanum content but with zirconium, which was prepared using the same process as Example 2 except by adding Zirconium oxychloride octahydrate 13.1 g. The product was tested under the same conditions listed in Example 2, which has a removal rate of 1.09 µm/min. Please refer to FIG. 3 for the SEM photo of resulted particles from Example 3.

Example 4

Particles Comprising Mn-based Additive

Figure 4:
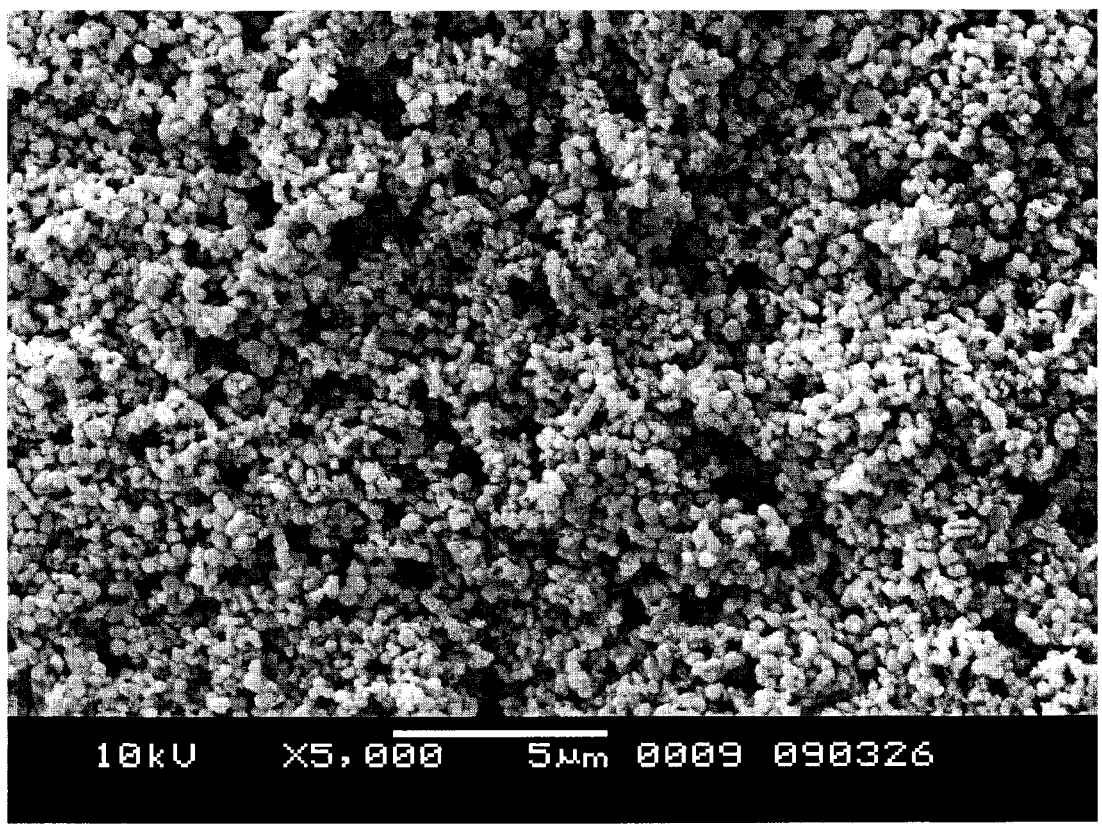

Product with same cerium and lanthanum content but with manganese, which was prepared using the same process as Example 2 except by adding manganese chloride tetrahydrate 5.58 g. The product was tested under the same conditions listed in Example 2, which has a removal rate of 0.96 µm/min. Please refer to FIG. 4 for the SEM photo of resulted particles from Example 4.

Example 5

Particles Comprising Al-based Additive

Figure 5:
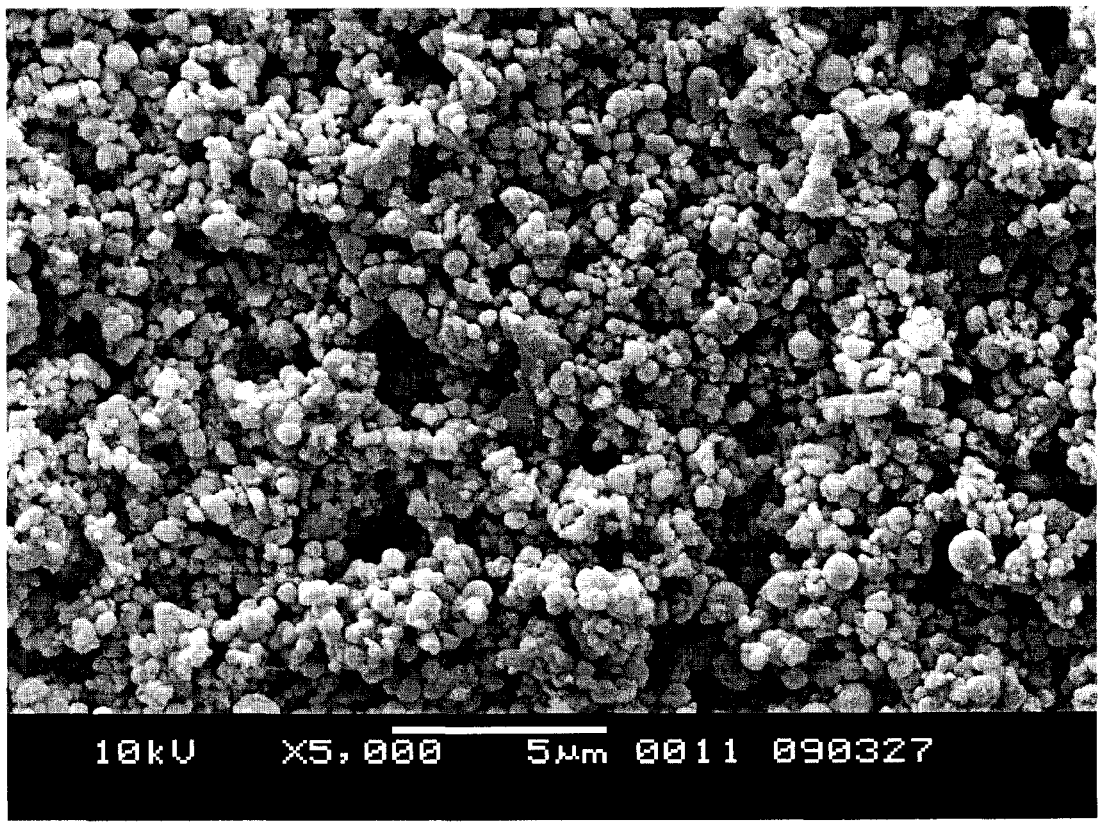

Product with same cerium and lanthanum content but with aluminum, which was prepared using the same process as Example 2 except by adding aluminum 2 g before calcination. The product was tested under the same conditions listed in Example 2, which has a removal rate of 0.4 µm/min Please refer to FIG. 5 for the SEM photo of resulted particles from Example 5.

One might also consider presenting data with different amounts of additive, such as product with same cerium and lanthanum content but different amounts of iron, which was prepared using the same process as Example 2 except by adding Iron chloride hexahydrate 0.676 g. This product has a removal rate of 0.91 μm/min.

Example 6

Particles Comprising Fe-based Additive with Low Proportion of La

Figure 6:
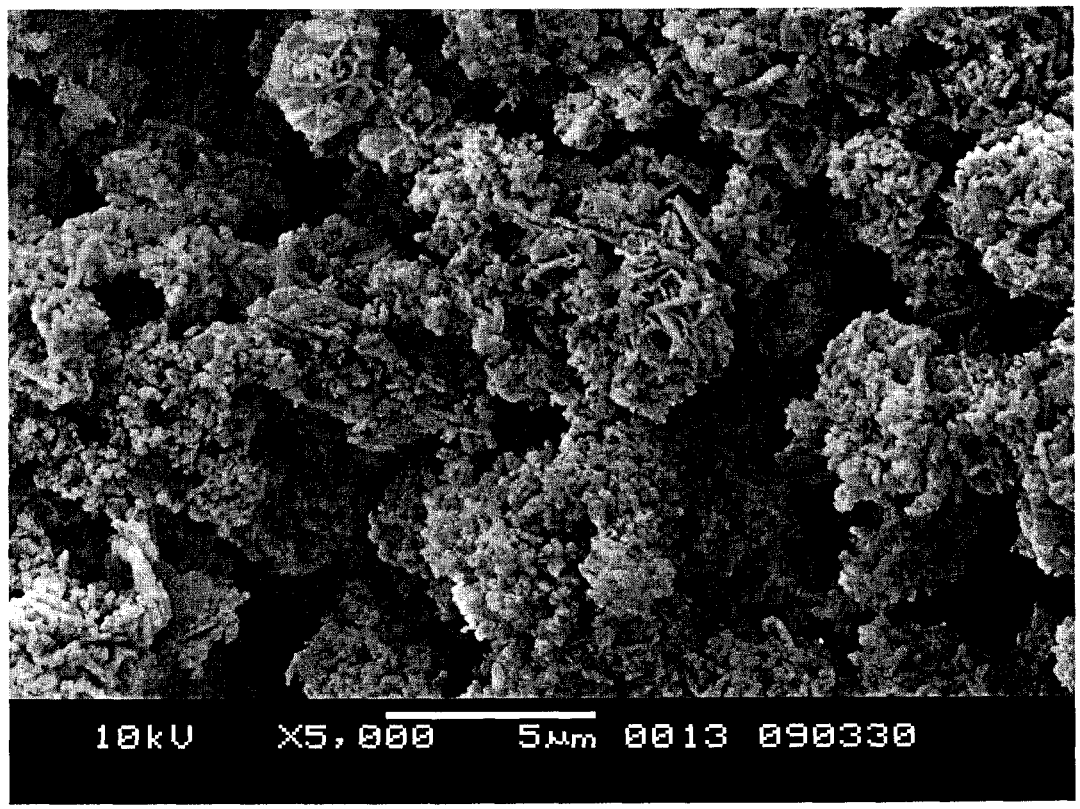

The cerium chloride aqueous solution of 720 ml, and the lanthanum chloride aqueous solution of 80 ml were mixed, and further added with the Iron chloride hexahydrate 3.38 g to obtain a mixture liquid of about 800 ml. The ration in terms of oxide mass of respective rare earth elements and iron contained in the mixed liquid was 90:10:1(=$CeO_2$:$La_2O_3$:$Fe_2O_3$). The powder was prepared using the same process as Example 2, and the resulting product was tested under the same conditions listed in Example 2, which has a removal rate of 0.56 μm/min. Please refer to FIG. 6 for the SEM photo of resulted particles from Example 6.

Example 7

Particles Comprising Fe-based Additive with High Proportion of La

Figure 7:
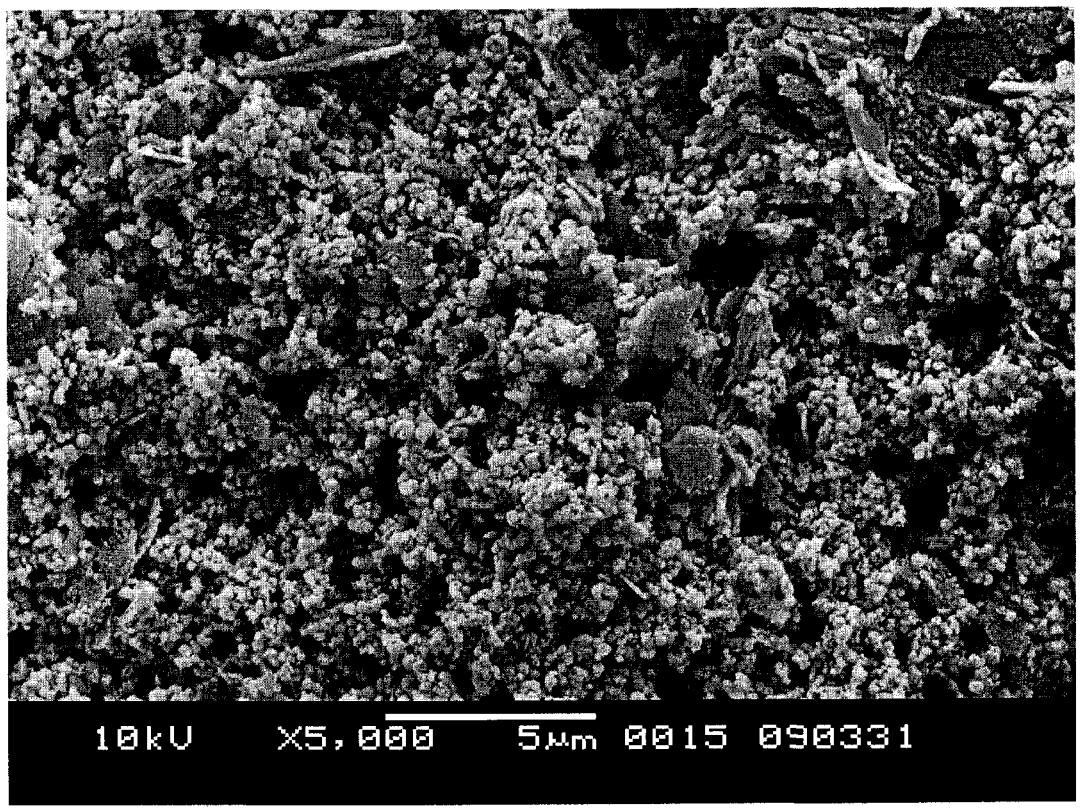

The cerium chloride aqueous solution of 400 ml, the lanthanum chloride aqueous solution of 400 ml were mixed, and further added with the Iron chloride hexahydrate 3.38 g to obtain a mixture liquid of about 800 ml. The ration in terms of oxide mass of respective rare earth elements and iron contained in the mixed liquid was 50:50:1(=$CeO_2$:$La_2O_3$:$Fe_2O_3$). The powder was prepared using the same process as Example 2, and the resulting product was tested under the same conditions listed in Example 2, which has a removal rate of 0.56 μm/min. Please refer to FIG. 7 for the SEM photo of resulted particles from Example 7.

TABLE 1

| Apparatus used in detection of the product | | |
|---|---|---|
| | Brand | Model |
| SEM | JEOL | JSM-5610LV |
| XRD | Regaku | D/max-2200PC |

What is claimed:

1. A cerium-based particle composition comprising: cerium oxide 50~90% by weight, lanthanum oxide at least 10% by weight, and an additive, wherein the additive contains an oxide of Fe, Zr, Mn, or Al.

2. The particle composition according to claim 1, wherein the content of lanthanum oxide is at least 15% by weight.

3. The particle composition according to claim 1, wherein the content of the additive is 0.2~5% by weight.

4. The particle composition according to claim 1, wherein the additive is dispersed as a solid dispersion in the composition.

5. The particle composition according to claim 1, wherein a particle size of the particle composition is 0.5~1.5 μm.

6. The particle composition according to claim 1, wherein the content of cerium oxide is 60~85% by weight.

7. A cerium-based abrasive comprising the particle composition according to claim 1.

8. A method of polishing glass substrate, characterized by using the cerium-based abrasive as defined in claim 7.

9. The particle composition according to claim 3, wherein the additive is dispersed as a solid dispersion in the composition.

10. The particle composition of claim 1, wherein the content of cerium oxide is 60~85% by weight and the content of lanthanum oxide is at least 15% by weight.

11. The particle composition of claim 10, wherein the content of the additive is 0.2~5% by weight.

12. The particle composition of claim 10, wherein the additive is dispersed as a solid dispersion in the composition.

13. The particle composition of claim 12, wherein the content of the additive is 0.2~5% by weight.

14. The particle composition of claim 11, wherein the additive is dispersed as a solid dispersion in the composition.

15. A method of preparing a cerium-based particle composition, the method comprising:
one or more water soluble salts of one or more transition metal elements and/or one or more alkaline metal elements are mixed with a $CeLaCl_3$ solution;
the $CeLaCl_3$ solution is precipitated with a carbonate and/or a hydroxide to obtain a rare earth carbonate doped by said one or more transition metal elements and/or alkaline metal elements;
the rare earth carbonate is calcined to obtain a rare earth metal oxide doped by said one or more transition metal elements and/or alkaline metal elements; and
the rare earth metal oxide is crushed to obtain the particle composition; wherein the composition contains cerium oxide 50~90% by weight and lanthanum oxide at least 10% by weight.

16. The method of claim 15, wherein the composition contains at least 15% lanthanum oxide by weight.

17. The method of claim 15, wherein the composition contains 60~85% cerium oxide by weight.

18. The method of claim 17, wherein the composition contains at least 15% lanthanum oxide by weight.

19. The method of claim 15, wherein the one or more transition metal elements and the one or more alkaline earth metal elements are selected from the group consisting of Fe, Zr, Mn, and Al.

20. The method of claim 19, wherein the composition contains the additive 0.2~5% by weight of the composition.

* * * * *